US011431261B2

(12) United States Patent
Qiu et al.

(10) Patent No.: US 11,431,261 B2
(45) Date of Patent: Aug. 30, 2022

(54) HYBRID BULK CAPACITANCE CIRCUIT FOR AC INPUT AC/DC SWITCHING MODE POWER SUPPLIES

(71) Applicant: GaN Systems Inc., Ottawa (CA)

(72) Inventors: Yajie Qiu, Kanata (CA); Xuechao Liu, Kanata (CA)

(73) Assignee: GaN Systems Inc., Kanata (CA)

( * ) Notice: Subject to any disclaimer, the term of this patent is extended or adjusted under 35 U.S.C. 154(b) by 0 days.

(21) Appl. No.: 17/230,390

(22) Filed: Apr. 14, 2021

(65) Prior Publication Data

US 2021/0234471 A1 Jul. 29, 2021

Related U.S. Application Data

(63) Continuation-in-part of application No. 17/070,309, filed on Oct. 14, 2020.

(60) Provisional application No. 62/946,563, filed on Dec. 11, 2019.

(51) Int. Cl.
*H02M 1/36* (2007.01)
*H02M 7/217* (2006.01)
*H02M 1/00* (2006.01)
*H02J 7/02* (2016.01)

(52) U.S. Cl.
CPC ......... *H02M 7/217* (2013.01); *H02M 1/0006* (2021.05); *H02M 1/36* (2013.01); *H02J 7/02* (2013.01)

(58) Field of Classification Search
CPC .......... H02M 7/217; H02M 1/08; H02M 1/36; H02M 7/06; H02M 1/0006; H02M 1/4258; H02M 1/10; H02M 3/07
See application file for complete search history.

(56) References Cited

U.S. PATENT DOCUMENTS

| 7,760,524 B2 | 7/2010 | Matthews | |
|---|---|---|---|
| 10,158,282 B1 * | 12/2018 | Maruyama | ......... H02M 1/4225 |
| 2013/0336031 A1 * | 12/2013 | McCune, Jr. | ....... H02M 7/2176 |
| | | | 363/80 |

(Continued)

OTHER PUBLICATIONS

Pickering, Paul; "The Active Clamp Flyback Converter: A Design Whose Time Has Come"; Electronic Design; Apr. 9, 2018; 9 pages.

*Primary Examiner* — Sibin Chen

(74) *Attorney, Agent, or Firm* — Miltons IP/p.i.

(57) ABSTRACT

A bulk capacitor circuit for an AC input AC/DC Switching Mode Power Supply, such as an AC/DC adapter/charger without active power factor correction, is provided, comprising a plurality of bulk capacitors having different voltage ratings, and driver and control circuitry comprising AC input voltage sensing and comparator circuitry, which enables selective connection of one or more of the plurality of bulk capacitors, responsive to a sensed AC input voltage range. A startup circuit provides power to the driver circuit initially, so that the AC input voltage can be determined before power-up and enabling of the DC/DC converter. This solution provides for a reduction in capacitor volume, with associated improvement in the power density of an isolated AC/DC power supply, while the startup circuit ensures that an appropriate bulk capacitance is connected at startup for low line AC input, to maintain the ripple voltage in an appropriate range for reliable operation.

20 Claims, 8 Drawing Sheets

(56) References Cited

U.S. PATENT DOCUMENTS

2017/0317594 A1* 11/2017 Lind ................. H02M 1/36
2018/0367030 A1* 12/2018 Lethellier ........... H02M 1/4241

* cited by examiner $$Pin = \frac{1}{2}C_{in}(V_{pkmin}^2 - V_{inmin}^2)f_L$$

$$C_{in} = \frac{2Pin}{(V_{pkmin}^2 - V_{inmin}^2)f_L}$$

$f_L = 120Hz$
$V_{pkmin} = \sqrt{2}V_{acmin}$
Assuming: $V_{inmin} = 70\%V_{pkmin}$ e.g. 65W AC/DC Charger Vac=90V~160V    Vac=160V~264V
~120uF/250V     ~47uF/400V Bulk capacitors having different voltage ratings can be selected for different AC input ranges

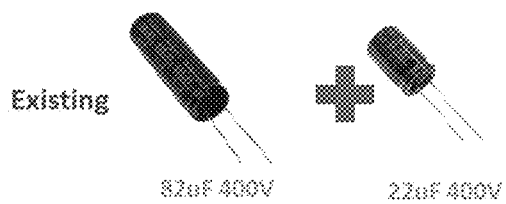
| Cap Spec. | Part # | D (mm) | H (mm) | R (mm) | V (mm³) | Unit Price |
|---|---|---|---|---|---|---|
| 82uF 400V | 1189-1323-3-ND | 12.5 | 42 | 6.25 | 5154 | 1.919 |
| 22uF 400V | 1189-3758-3-ND | 12.5 | 22 | 6.25 | 2700 | 0.533 |
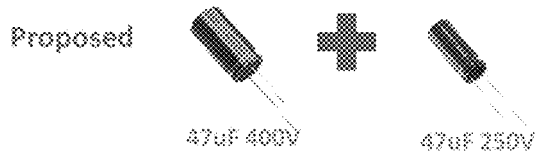
| Cap Spec. | Part # | D (mm) | H (mm) | R (mm) | V (mm³) | Unit Price |
|---|---|---|---|---|---|---|
| 47uF 400V | 565-4247-ND | 12.5 | 32 | 6.25 | 3927 | 1.158 |
| 47uF 250V | 493-13093-3-ND | 10 | 26.5 | 5 | 2081 | 0.621 |
Fig. 7
| Solution | Total volume (mm³) | Total price ($CAD) |
|---|---|---|
| Existing | 7854 | 2.452 |
| Proposed | 6008 | 2.279 |
| Difference | 1846 | 0.173 |
| % | 23.5% | 7% |
- Proposed cost includes additional sense and control circuit cost of $0.5 CAD
- Cost based on 1kpcs/yr
Fig. 8

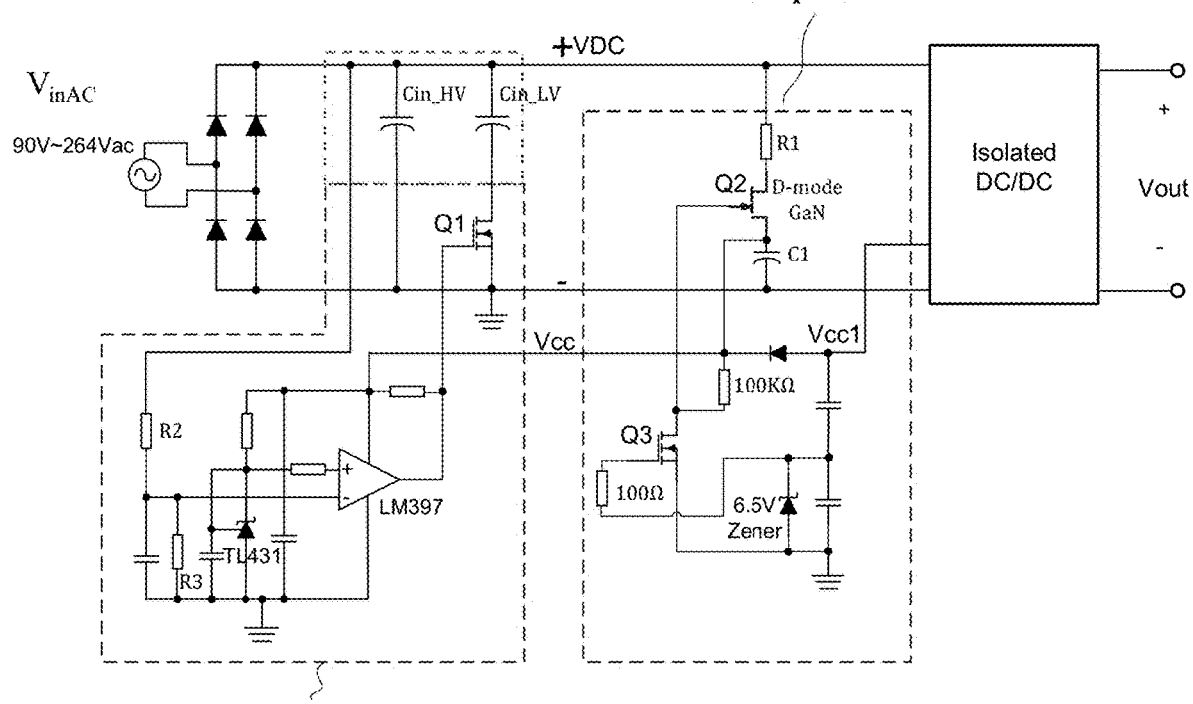

- Cin_HV: High voltage capacitor
- Cin_LV: Low voltage capacitor
- R1 Q2 and C1: Start up circuit for VCC
- R2 and R3: a resistor divider determines the Q1 turn on/off point when AC is powered up, for example: at VDC<200V, Q1 is on with Cin_LV connected to DC link VDC, when VDC>200V, Q1 is off with Cin_VL disconnected to the DC link VDC.
- Q3 and 6.5V Zener: when Vcc1 is not ready (below 8V), Q3 is open to turn-on Q2; when Vcc1 is above 8V (e.g. 12V), Q3 is turned on and Q2 is turned off

Fig. 9

Simulation at 230VAC input

Simulation at 110VAC input

HYBRID BULK CAPACITANCE CIRCUIT FOR AC INPUT AC/DC SWITCHING MODE POWER SUPPLIES

CROSS-REFERENCE TO RELATED APPLICATION(S)

This application is a continuation-in-part of U.S. patent application Ser. No. 17/070,309 entitled HYBRID BULK CAPACITANCE CIRCUIT FOR AC/DC CHARGER, filed Oct. 14, 2020, which claims the benefit of U.S. Provisional Patent Application No. 62/946,563 entitled HYBRID BULK CAPACITANCE CIRCUIT FOR AC/DC CHARGER, filed Dec. 11, 2019, which are incorporated herein by reference in their entirety.

TECHNICAL FIELD

This invention relates to AC/DC Switching Mode Power Supplies (SMPS) for low power electronics, such as Universal AC input AC/DC chargers and adapters, and improvements thereto.

BACKGROUND

In a typical low power AC/DC charger or power adapter, without active power factor correction e.g. ≤75 W for small personal electronic devices, bulk capacitors occupy a large percentage of the volume of the casing.

Using GaN power transistors, instead of silicon power transistors provides several advantages. Compared to silicon MOSFETs, GaN HEMTs have lower on-resistance, higher breakdown voltage, no reverse-recovery characteristics and can operate at higher temperatures. GaN devices have much lower switching losses, so they can operate at higher switching frequencies. Higher switching frequencies allow for the use of smaller capacitors and inductors, which can significantly reduce the power converter size, weight and cost.

As an example, in an Anker 65 W AC/DC adapter configured for a Universal AC input of 90-265 VAC (47-63 Hz) and a fixed output voltage of 20V (65 W), based on an ACF topology using a Texas Instruments high-frequency ACF controller TI UCC28780, operating at a switching frequency of 500-600 kHz, provides a power density of 2.9 W/cm$^3$ (47 W/in$^3$) uncased, and 1.7 W/cm$^3$ (27 W/in$^3$) cased. However, approximately 35% of the uncased volume is occupied by the bulk capacitors.

There is demand for AC/DC SMPS, such as Universal AC input AC/DC chargers based on ACF (Active Clamp Flyback) topology or other Flyback topologies, that are more compact and lightweight, and which are powerful enough for charging one or several smartphones, tablets, laptops and other small electronic devices. Usually, low power AC/DC SMPS, e.g. <75 W, do not require active Power Factor Correction (PFC), although passive PFC may be used.

Universal AC input AC/DC power supplies are designed to operate over a wide range of AC input voltage, typically between 85 Volts AC and 265 Volts AC. Where the power supply has a single bulk capacitor, the voltage rating is selected for reliable operation at the maximum AC input voltage, and the capacitance is selected to meet the energy storage requirements for operation at the minimum AC input voltage. Physically large capacitors are required to provide higher capacitance values needed for the minimum AC input voltage, with a voltage rating needed for the maximum AC input. Capacitors rated for higher voltages are more costly.

To reduce the capacitor volume it is known to provide an energy storage circuit comprising a low voltage capacitor and a high voltage capacitor. For example, U.S. Pat. No. 7,760,524 issued Jul. 20, 2010, entitled "Method and apparatus to reduce the volume required for bulk capacitance in a power supply" discloses a driver circuit comprising a high voltage capacitor and a low voltage capacitor. In this circuit, a bias voltage VBIAS is required to supply the control circuit, and the low voltage capacitor is not connected if there is no bias voltage, e.g. during power start up, which can cause reliability issues for operation with low line AC input.

There is a need for improved or alternative AC input AC/DC SMPS, such as Universal AC input AC/DC chargers and power adapters, providing at least one of size reduction, increased power density and improved reliability.

SUMMARY OF INVENTION

The present invention seeks to provide an improved or alternative AC input AC/DC SMPS, for applications such as, a Universal AC input AC/DC charger or adapter.

A bulk capacitor circuit and a startup circuit for an AC input AC/DC SMPS is disclosed, in which a plurality of bulk capacitors of different voltage ratings are optionally or selectably connectable, dependent on the input voltage range.

One aspect of the invention provides a bulk capacitor circuit for a AC input AC/DC charger/adapter comprising: a plurality of bulk capacitors having different voltage ratings; an input for connection to a power source; an output for connection to a DC/DC converter; a switch means for selectively connecting the plurality of the bulk capacitors, between the input and output; an input voltage sensor; and control and driver circuitry; wherein: the control and driver circuitry is configured to receive a signal from the input voltage sensor indicative of the input AC voltage, and responsive to said signal, the circuit operates to control the switch means and connect at least one of the plurality of bulk capacitors.

Another aspect of the invention provides a bulk capacitor circuit for an AC input AC/DC Switching Mode Power Supply (SMPS) which provides a DC voltage $V_{DC}$ to a DC/DC converter, comprising:
a plurality of bulk capacitors having different voltage ratings; driver and control circuitry comprising input voltage sensing circuitry which senses an input voltage range; and
a startup circuit connected to receive the DC voltage $V_{DC}$ and provide an initial supply voltage Vcc to the driver and control circuitry, so that the input voltage range is sensed, and said one or more of the plurality of bulk capacitors is connected, before enabling the DC/DC converter.

For example, the bulk capacitor circuit is configured to connect said one or more of the plurality of bulk capacitors to provide a bulk capacitance at startup with low line AC input, to maintain a ripple voltage in a specified range for reliable operation. Also provided is an AC input AC/DC Switching Mode Power Supply (SMPS) comprising the bulk capacitor circuit.

For example, the plurality of bulk capacitors comprises: a first bulk capacitor having capacitance value C1 and a voltage rating for a first input voltage range including a maximum rated input voltage; a second bulk capacitor having a capacitance value C2 and a voltage rating for a second input voltage range, below the first input voltage range; wherein the circuit operates to connect the first bulk capacitor to provide a capacitance of C1 for the first input voltage range; and to connect the first and second bulk capacitors to provide a combined capacitance value of C1+C2 for the second input voltage range.

Thus, the switch means acts to connect one or more of the plurality of bulk capacitors, in parallel across the input, as needed, dependent on the AC input voltage that is sensed.

The capacitor values C1 and C2 are calculated based on a ripple voltage wherein:

wherein: $C=2P_{in}(V^2_{pkmin}-V^2_{inmin})f_L$ where $P_{in}$ is the required power, $V_{pkmin}$ is the allowed peak voltage at minimum AC voltage; $V_{inmin}$ the allowed valley voltage at minimum AC voltage; and $f_L$ is the input AC line frequency.

Where the bulk capacitance circuit comprises more than two capacitors C1 ... Cn, e.g. three or capacitors for different voltage ranges, e.g. the circuit operates to connect the first capacitor for a first input voltage range; to connect first and second capacitors for a second voltage range, and to connect first second and third capacitors for a third input voltage range, wherein the first voltage range is higher than the second voltage range and the second voltage range higher than the third voltage range.

In some embodiments, the first capacitor is always connected, and the second capacitor, and other capacitor(s) if applicable, are optionally or selectively connected in response to the signal indicative of input voltage.

While each of the capacitors C1, C2 ... Cn may comprise a single capacitor, alternatively one or more of the capacitors C1 to Cn may be multiple single capacitors connected in parallel. Capacitor values are selected to meet performance requirements for each input voltage range and to minimize a total capacitor volume of the plurality of capacitors.

For example, where the Universal AC input AC/DC charger is rated for an input of 90-265 VAC, and for a power of ≤100 W, wherein the first input voltage range comprises 160 to 265 VAC and the second input voltage range comprises 90 to 160 VAC, and comprising first and second capacitors, having values C1 rated at 400V and C2 rated at 250V, where C1 is selected for operation in the first (higher) input voltage range, and both C1 and C2 are selected to provide a combined capacitance of C1+C2 for operation in the second (lower) input voltage range. For example, in an embodiment requiring a capacitance C1 of ~50 g rated at 400V for operation in the range 160-265 VAC, and a capacitance C1+C2 of ~100 g, i.e. 2×C1, for operation in the 90 to 160 VAC range, two capacitors of different voltage rating, and equal capacitance can be provided, i.e. C1 is ~47 g 400V and C2 is ~47 μF 400V.

The control and driver circuitry may be implemented at low cost using a comparator driver circuit. It may include an enable/disable control link to the DC/DC converter, which can be used for AC input under-voltage or over-voltage protection.

In an embodiment, the DC/DC converter comprises an active clamp flyback topology. This topology may be implemented using GaN switching transistors to provide a very compact Universal AC input AC/DC charger, with high power density. However, using a standard arrangement of capacitors, in which all capacitors are voltage rated based on the maximum AC input voltage, and have a total capacitance required for operation at the lowest input voltage range, further size reduction is limited by the volume taken up by the bulk capacitors. Implementation of an AC input, or Universal AC input, AC/DC charger using ACF topology or other Flyback topologies, such as QR Flyback, and other AC/DC converter topologies, with the hybrid bulk capacitor circuit disclosed herein allows for use of smaller volume capacitors, which reduces the system volume and provides improved power density.

A bulk capacitance circuit with a fast startup circuit as disclosed herein is used for fast sensing of the input AC voltage range at startup, to ensure that if the input line voltage is below a specified value, sufficient capacitance for reliable operation is connected.

For example, the startup circuit provides power to the driver circuit initially, so that the AC input voltage range can be determined before power-up and enabling of the DC/DC converter. This solution provides for a reduction in capacitor volume, with associated improvement of power density of an isolated AC/DC SMPS, while the startup circuit ensures than an appropriate bulk capacitance is connected at startup for low line AC input, e.g. to maintain the ripple voltage in an appropriate range for reliable operation, and to avoid mis-triggering of overcurrent protection or transformer saturation.

The bulk capacitor circuit and startup circuit of example embodiments are potentially applicable to many AC input AC/DC SMPS without active PFC.

BRIEF DESCRIPTION OF THE DRAWINGS

FIG. 7 shows some examples of volumes and characteristics of capacitors for existing and proposed solutions;

FIG. 8 shows a table with a Bill of Materials (BOM) comparison;

FIG. 9 shows a circuit schematic for an implementation of a hybrid bulk capacitance circuit of a second example embodiment comprising hybrid bulk capacitance circuit and a start-up circuit;

The foregoing and other objects, features, aspects and advantages of the present invention will become more apparent from the following detailed description, taken in conjunction with the accompanying drawings, of some illustrative embodiments of the invention, which description is by way of example only.

DETAILED DESCRIPTION

Figure 1:
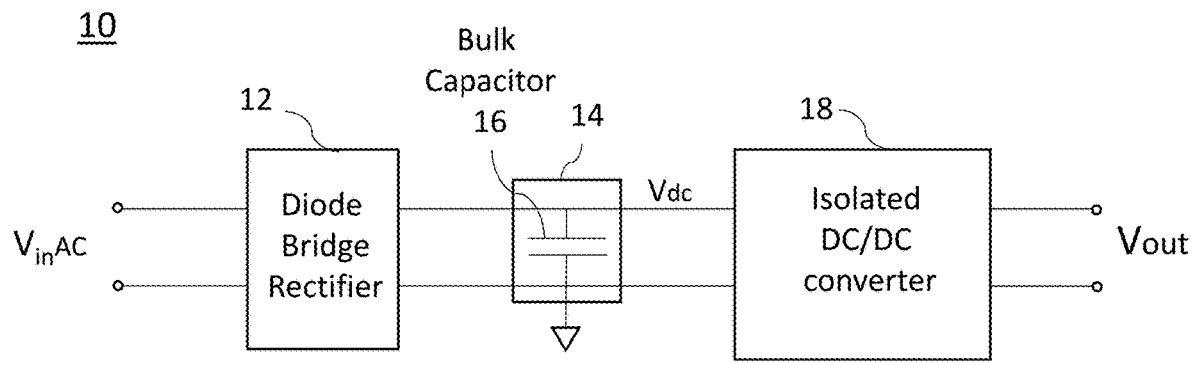
FIG. 1 (Prior Art) shows a simplified functional block diagram for an SMPS, such as an AC/DC adapter without active power factor correction.

FIG. 1 shows a simplified functional block diagram for an example of a generic AC/DC SMPS 10, i.e. for a power supply or charger, without active power factor correction (PFC), comprising a rectifier 12, such as a diode bridge and a bulk energy storage circuit 14 comprising a bulk capacitor 16, providing a DC voltage Vdc to an isolated DC/DC converter 18.

Figure 2:
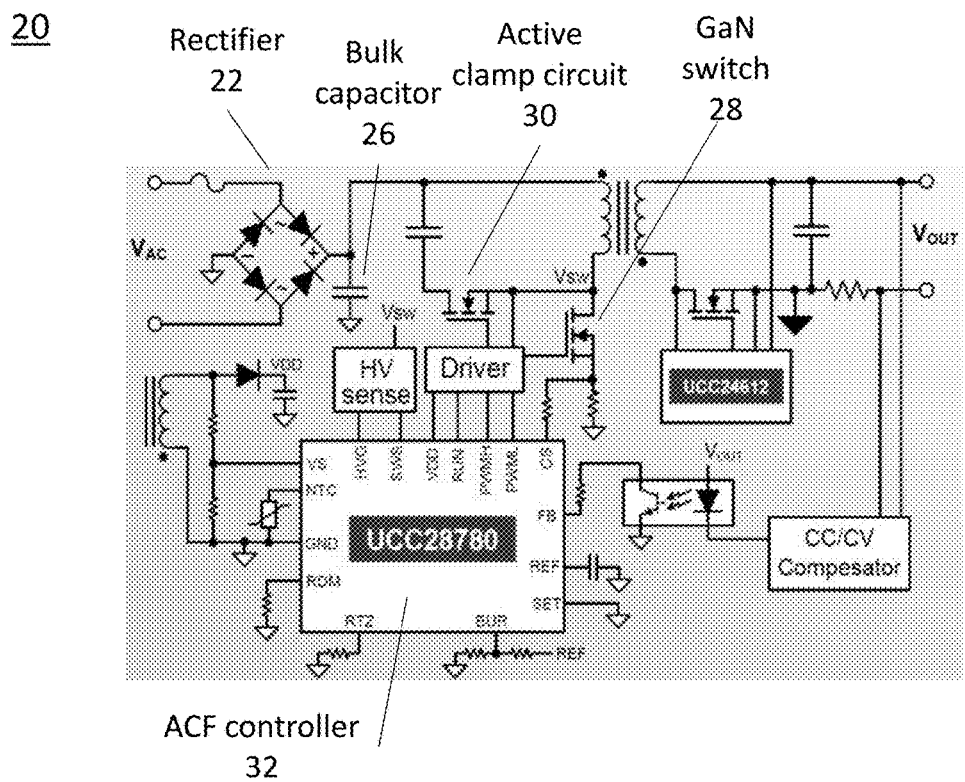
FIG. 2 (Prior Art) shows a circuit schematic for an example AC/DC adapter having an active clamp flyback (ACF) topology.

FIG. 2 shows a circuit schematic for an example SMPS comprising an AC/DC adapter 20 based on a commonly used active clamp flyback (ACF) topology. For example, a Universal AC/DC adapter for charging small personal electronics is configured for a Universal AC input of 90-265 VAC, and a line frequency of 47-63 Hz; a Texas Instruments high-frequency ACF controller TI UCC28780 is used for operating the GaN power switching transistor 28, at a switching frequency of 500-600 kHz. The circuit includes diode bridge rectifier 22, bulk capacitor 26, active clamp circuit 30. For background information, design and operation of AC/DC power converters based on an Active Clamp Flyback topology is reviewed in an article by Paul Pickering, entitled "The Active Flyback Converter: A Design Whose Time Has Come", Electronic Design, Apr. 9, 2018.

In conventional circuit designs, a bulk capacitor, or two or more bulk capacitors connected in parallel, are selected to provide a required capacitance value (i.e. for parallel connected capacitors C1, C2 . . . Cn, the total capacitance=C1+ C2+ . . . Cn) and to have a voltage rating the meets or exceeds the maximum rated input voltage. For example, for a maximum rated input voltage of 265 VAC, all the capacitors would be rated for 400V, and the capacitor value(s) are calculated based on required specifications, e.g. a required input voltage regulation range.

Figures 3, 4:
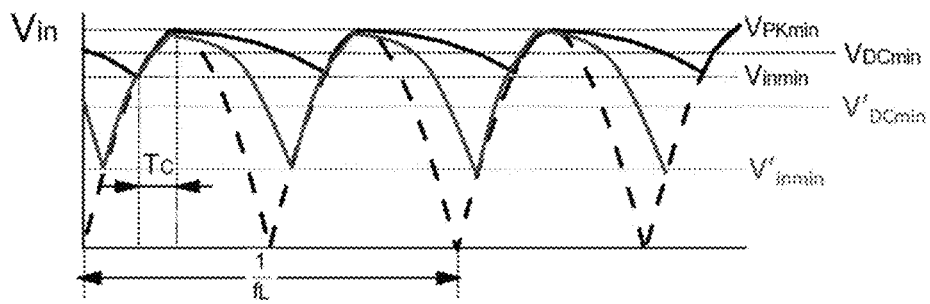
FIG. 3 shows a plot of voltage waveforms for an example AC/DC adapter for different bulk capacitor values.
FIG. 4 shows parameters and equations used to calculate the capacitance values and voltage rating for bulk capacitors for different AC input voltage ranges.

A plot of example voltage waveforms for an AC/DC adapter is shown in FIG. 3, with a comparison of parameters and design considerations for small (i.e. lower capacitance) and large (i.e. higher capacitance) bulk capacitors. In FIG. 3, the black dashed waveform represents the input voltage, i.e. as rectified by the diode bridge. The voltage waveforms V and V', represented respectively by solid black and red lines, are for different (large and small) capacitance values of the bulk capacitor. For a given input voltage, the ripple frequency of the voltage waveforms V and V' are two times the input ac line frequency. Waveforms shown are minimum peak voltage $V_{PKmin}$, valley voltages $V_{inmin}$ and $V'_{inmin}$, minimum DC input voltages $V_{DCmin}$ and $V'_{DCmin}$ respectively.

In example embodiments, for a low power AC/DC charger e.g. $P_0 \leq 100$ W, ripple voltage is considered instead of hold-up time. A bulk capacitor functions to control ripple voltage so that the input voltage of the isolated DC/DC is always within the regulation capability of the designed AC/DC converter. The bulk capacitor may be one or more capacitors connected in parallel to provide the total required capacitance.

Referring to FIG. 4, if the ripple voltage is considered, it can be shown that bulk capacitors having different values and voltage ratings can be selected for different AC input voltage ranges to provide a required ripple voltage, e.g. specifying Vinmin=70% $V_{pkmin}$. For example, if the AC/DC charger is only required to operate over a limited AC input voltage range, the bulk capacitor value and voltage rating would be selected accordingly to provide an appropriate ripple voltage. FIG. 4 shows examples of parameters and equations used to calculate the capacitance values and voltage rating for bulk capacitors for different AC input voltage ranges. As illustrated by the examples shown in FIG. 4, operation in a lower voltage range 90-160 VAC, to achieve a required ripple voltage, requires a high value capacitor, e.g. 120 g, having a voltage rating of >226V, e.g. 250V; and operation in a high voltage range 160-264V requires a lower value capacitor, e.g. 47 g having a higher voltage rating >373V, e.g. 400V.

Figure 5A:
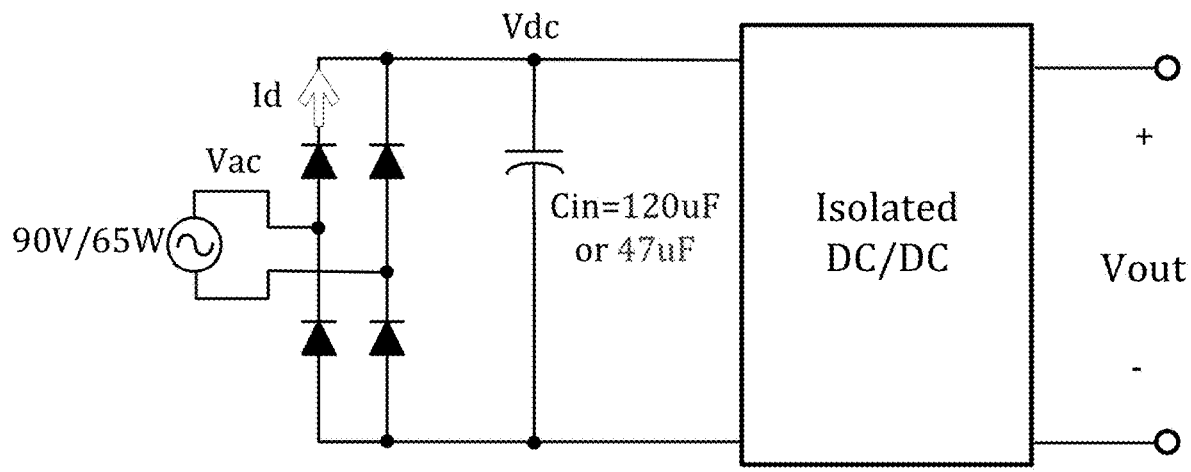
FIG. 5A shows a schematic functional block diagram of an AC/DC SMPS comprising a 65 W bridge rectifier and a bulk capacitor.
Figure 5B:
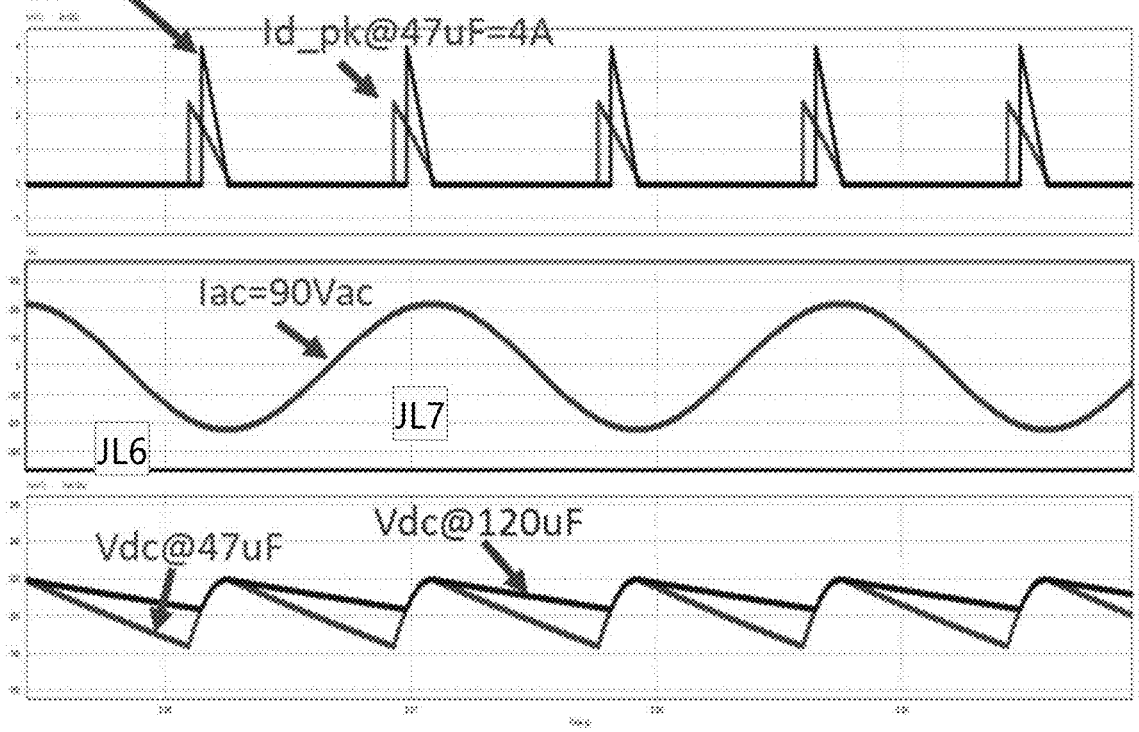
FIG. 5B shows plots of example waveforms for simulations for bulk capacitors of two different values.

Conventionally, if the AC/DC adapter is a Universal AC/DC charger, i.e. intended for worldwide use in multiple countries, the AC input range is specified as, e.g. 90-265 VAC at 47-63 Hz, and all bulk capacitors are selected to have a voltage rating of greater than the maximum voltage rating, i.e. >265V, so typically all capacitors are selected to have a voltage rating of 400V, and the total bulk capacitance value is selected to meet requirements for the entire operational voltage range, especially for a lower AC voltage range, that is, a total bulk capacitance value as required for lower voltage operation, e.g. ~100 μg. FIG. 5A shows a simplified schematic diagram of a 65 W AC/DC adapter comprising a bridge rectifier and a bulk capacitor, and FIG. 5A shows simulated waveforms for bulk capacitors of two different values, 120 g and 47 g. The middle waveform is the input AC current $I_{ac}$; the top waveforms are the current Id, showing the peak current Id_pk for each capacitor value; and the lower waveforms are the dc voltage Vdc for each capacitor value.

The above referenced related U.S. patent application Ser. No. 17/070,309, discloses a circuit for an AC input AC/DC adapter, such as a Universal AC input AC/DC charger, which comprises a plurality of capacitors having different voltage ratings that are connected in parallel, and a switching circuit comprising input voltage sensing and comparator drive circuitry, to allow for selective connection of one or more of the plurality of capacitors, responsive to a sensed input voltage. Since bulk capacitors occupy a significant proportion of the volume of an AC/DC charger, this solution provides for a reduction in capacitor volume, with associated improvement in the power density of an isolated AC/DC charger.

Figure 6:
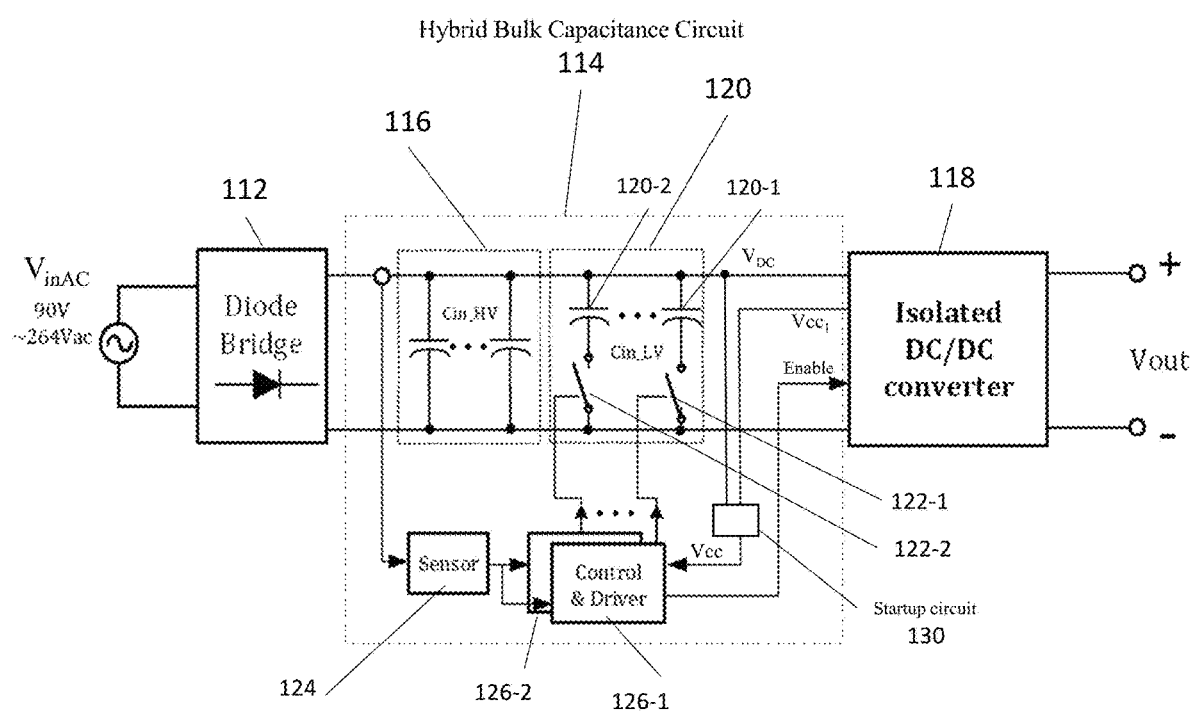
FIG. 6 shows a schematic circuit block diagram for an implementation of a hybrid bulk capacitance circuit of an example embodiment including two groups of bulk capacitors.

FIG. 6 shows a functional circuit diagram of a universal AC input AC/DC adapter 100, without power factor correction, comprising a diode bridge rectifier 112, an isolated DC/DC converter 118, and a hybrid bulk capacitance circuit (HBCC) 114 of an example embodiment, as disclosed in the above referenced related U.S. patent application Ser. No. 17/070,309. The HBCC 114 comprises a high voltage bulk capacitance Cin_HV 116, and a low voltage bulk capacitance Cin_LV 120, having different voltage ratings. The high voltage capacitance Cin_HV 116, which in this example comprises two capacitors in parallel, having a higher voltage rating and lower capacitance value, is connected across the DC link input. The low voltage capacitors Cin_LV 120 comprise first and second capacitors 120-1 and 120-2, which are rated for lower voltages, and are connected across the DC link input with series switches 122-1 and 122-2. Control means, e.g. control and driver circuitry 126-1 and 126-2 is provided for each switch 122-1 and 122-2, to selectively connect one or both capacitors 120-1 and 120-2 as additional low voltage capacitance Cin_LV only when needed, i.e. for a lower voltage range AC input. A lower voltage AC input requires bulk capacitors with a larger capacitance, but these capacitors can be rated for the lower voltage input, e.g. 250V. The HBCC 114 includes an input AC voltage sensor 124, and responsive to sensor input indicative of the input AC voltage, the control and driver circuit drives the switches 122-1 and 122-2, e.g. transistors, to connect or disconnect the capacitors 120-1 and 120-2 for Cin_LV as needed. This HBCC provides an adaptive capacitor switching arrangement that enables optimization of the bulk capacitors, i.e. to provide required capacitor values and voltage ratings for each required operational voltage range, while reducing or minimizing the volume of the bulk capacitors.

For example, the HBCC 114 comprises a first DC link bulk capacitor 116 Cin_HV having a value selected for high voltage operation, and a second DC link bulk capacitor 120 Cin_LV have a value selected for low voltage operation. Each of the first and second bulk capacitances 116 and 120 may be single capacitors, or they may be a plurality of capacitors, connected in parallel between the DC link, to provide the required capacitance value Cin_HV and Cin_LV. In the example illustrated in FIG. 6, the first bulk capacitor Cin_HV comprises two capacitor elements 116-1 and 116-2 connected in parallel. The second bulk capacitor Cin_LV comprises two elements 120-1 and 120-2 each connected in series with a respective switch 122-1 and 122-2, so that one or both of the capacitor elements 120-1 and 120-2 can be selectively connected, in parallel with the first bulk capacitor Cin_HV. The second bulk capacitors 122-1 and 122-2 are switchably connected depending on the input AC voltage. The HBCC 114 includes a voltage sensor 124 to sense the input voltage, and provide a signal to the control and driver circuitry to determine whether or not to one or more of the second DC link bulk capacitors are to be connected. The output of the voltage sensor is fed to the control and driver circuits 124-1 and 124-2 for each of the switches 122-1 and 122-2. for operating the first and second switches depending on the sense input voltage. For an AC input above a specified threshold voltage, only the first DC link bulk capacitors 116-1 and 11602 of Cin_HV are connected. Below the specified threshold voltage, one or both of the second DC link bulk capacitor(s) 120-1 and 120-2 of Cin_LV is/are connected.

For operation, the control and driver circuits require a supply voltage Vcc. Vcc may be supplied from the DC/DC converter, or from a separate bias voltage source. For example, as shown in FIG. 6, the control and driver circuitry are shown as powered by supply voltage Vcc from an auxiliary winding of the isolated DC/DC converter, and the control and driver circuitry includes an enable/disable control output for activating the DC/DC converter, i.e. to disable operation of the DC/DC converter until an appropriate capacitance value has been selected for the sensed AC input voltage, and enable operation after the capacitors are connected as required.

Example data shown in FIGS. 7 and 8, illustrate how the volume and cost of the AC/DC adapter can be reduced by using capacitors of different voltage ratings and smaller volume. FIG. 7 lists some examples of volumes and characteristics of capacitors to compare a conventional arrangement where all capacitors are selected to meet a maximum voltage rating, and a hybrid bulk capacitance circuit of an example embodiment. For example, where a conventional arrangement requires a total bulk capacitance of ~100 g, for a maximum voltage rating of >373V, e.g. capacitors with a voltage rating of 400V, two bulk capacitors are selected to be 82 g and 22 µg (FIG. 7). 104 uF is the minimum capacitance value required to keep the output of AC/DC charger regulatable. It is also acceptable to use two equal capacitators, e.g. two 56 g 400V capacitors in parallel. However, the total volume will be higher than the combination of 82 µF and 22 g. For the hybrid bulk capacitance circuit of the embodiment comprising two capacitors, the first capacitor calculation shows that, to provide the capacitance value need for HV operation, a 47 µF capacitor, voltage rated at >373V, e.g. 400V is required. For LV operation, an additional 47 µF capacitor is required, but this needs to be voltage rated at only >226V, e.g. 250V (FIG. 7). This combination of capacitors meets the requirements of a total capacitance of close to 100 g for lower voltage range operation, when both capacitors are connected. And for higher voltage range operation, only the 47 µF, 400V rated capacitor is connected.

FIG. 8 shows a table with a Bill of Materials (BOM) comparison. In this example, a hybrid bulk capacitance circuit, which enables selection of one or more bulk capacitors responsive to the input AC voltage, results in a potential capacitor volume reduction of about 23% and an estimated cost reduction of about 7%. This translates to a system volume reduction of e.g. at least 8%. Because two smaller separate capacitors allow for increased flexibility of the component layout, e.g. with closer packing of components, an arrangement of multiple bulk capacitors as disclosed herein facilitates achieving an AC/DC charger with a higher power density.

The high voltage capacitance Cin_HV may comprise one capacitor, or more than one capacitor in parallel, e.g. as illustrated in FIG. 6, selected to provide the required capacitance value, while minimizing the capacitor volume. Correspondingly, the low voltage capacitance Cin_LV may comprise one capacitor or more than one capacitor in parallel, selected to provide a required capacitance value, while minimizing the capacitor volume. If the low voltage capacitance Cin_LV comprises more than one capacitor, these may be individually switched as illustrated in FIG. 6, so that a first low voltage capacitor 120-1 can be connected when the sensed AC input voltage is below a first threshold voltage, and a second low voltage capacitor 120-2 can be connected when the sensed AC input voltage is below a second threshold voltage.

A circuit schematic for an implementation of a hybrid bulk capacitance circuit (HBCC) of another example embodiment is shown in FIG. 9, which comprises two capacitors, one high voltage capacitor Cin_HV and one low voltage capacitor Cin_LV, as a simplified example to illustrate this design principle. A first bulk capacitor Cin_HV is connected between the voltage inputs as conventional. The second bulk capacitor Cin_LV is connected between the voltage inputs with a series transistor switch Q1, so that the second bulk capacitor Cin_LV can be selectively connected to add bulk capacitance when required for lower voltage operation. The transistor switch Q1 is controlled by the HBCC. Control and driver circuitry receive a signal from an input voltage sensor. The signal from the voltage sensor is indicative of the input AC input voltage. The control circuitry and driver circuitry then operates the transistor switch Q1 to connect the second bulk capacitor Cin_LV, in parallel with the first bulk capacitor Cin_HV, when required for lower voltage operation. In the implementation of the hybrid bulk capacitance circuit of the embodiment shown in FIG. 9, the input voltage sensor and the control and driver circuit for the capacitor switch is implemented as a comparator circuit. Resistors R2 and R3 provide a resistive divider to sense the input AC voltage when the AC input is powered up, to determine whether the AC input is above or below a threshold to connect the second, low voltage bulk capacitor Cin_LV. For example for $V_{DC}$<200V, Q1 is on, with Cin_LV connected to the DC link $V_{DC}$, and when $V_{DC}$>200, Q1 is off so that Cin_LV is disconnected from the DC link $V_{DC}$. Any suitable implementation of the HBCC circuit comprising the capacitors Cin_HV and Cin_LV, transistor switch, voltage input sensor, and control and driver circuitry may be used and preferably it is simple, compact, and low cost. The voltage after the diode bridge is sensed and compared with a reference voltage, which can control and drive the transistor switch to connect/disconnect the second bulk capacitor Cin_LV dependent on, i.e. responsive to, the sensed input voltage. The fast control and switching of capacitors, e.g. using a GaN transistor switch instead of a silicon MOSFET switch, may speed up the starting up process of the AC/DC charger. Also a low Rds_on switch is preferred to reduce the loss on the switch (switching losses). There is a trade-off between the performance and the cost.

For fast startup, to supply the HBCC quickly without additional bias voltage, a startup circuit is provided. The startup circuit comprises a normally-on, depletion mode (D-mode) transistor switch Q2, which is preferably comprises a D-mode GaN transistor. For example Q2 is a D-mode GaN transistor which is turned on when its gate-to-source voltage $V_{gs}$ is 0V, and turned off when $V_{gs} \leq -3V$, with an absolute maximum $Vgs_{off}$ of −20V. The startup circuit can operated quickly without additional bias voltage to determine the required DC link bulk capacitor before the converter is powered up. Q3 is a low voltage transistor (e.g. 30V) which controls switching on and off of the D-mode transistor Q2. When $V_{cc1}$ from the isolated DC/DC converter is below 8V, Q3 is turned off, and Q2 is turned on, with the gate-to-source voltage of Q2, $V_{gs\_Q2}$, being 0V. When $V_{cc1}$ is above 8V, e.g. 12V, Q3 is turned on, which brings the gate-to-source voltage of Q2, $V_{gs\_Q2}$, to −12V, and Q2 is turned off.

Thus, during startup, the startup circuit provided for fast high voltage startup using a D-mode GaN transistor switch to provide a supply voltage $V_{cc}$ for HBCC operation, so that the HBCC can operate without the additional bias voltage $V_{cc1}$ from the isolated DC/DC converter. At power up, the DC/DC converter needs sufficient time, e.g. from 5 ms to 150 ms, to startup. When the DC/DC converter starts to operate, and the auxiliary bias voltage $V_{cc1}$ is above 8V, e.g. 12V, the startup circuit is disconnected from the DC link $V_{DC}$, i.e. when Q2 is turned off, and the supply voltage $V_{cc}$ for the HBCC is then directly supplied by $V_{cc1}$ without R1 resistance loss. The high voltage startup circuit can be integrated with the DC/DC converter, or with the driver circuitry.

The high voltage start-up circuit supplies the HBCC quickly, without additional bias voltage, during start up so that the HBCC can determine the required DC link capacitance before the DC/DC converter is powered up. The fast high voltage start-up circuit prevents mis-triggering of overcurrent protection or transformer saturation during converter start-ups, to provide a system with improved reliability.

The high voltage start-up circuit provides a simple, flexible solution which overcomes disadvantages of powering the HBCC circuit from the DC/DC converter during startup.

The operation of the HBCC and the startup circuit will be described in more detail with reference to FIG. 10 and FIG. 11, which show example waveforms for simulations for AC inputs of 230 VAC and 110 VAC.

Simulation at 230 VAC

Figure 10:
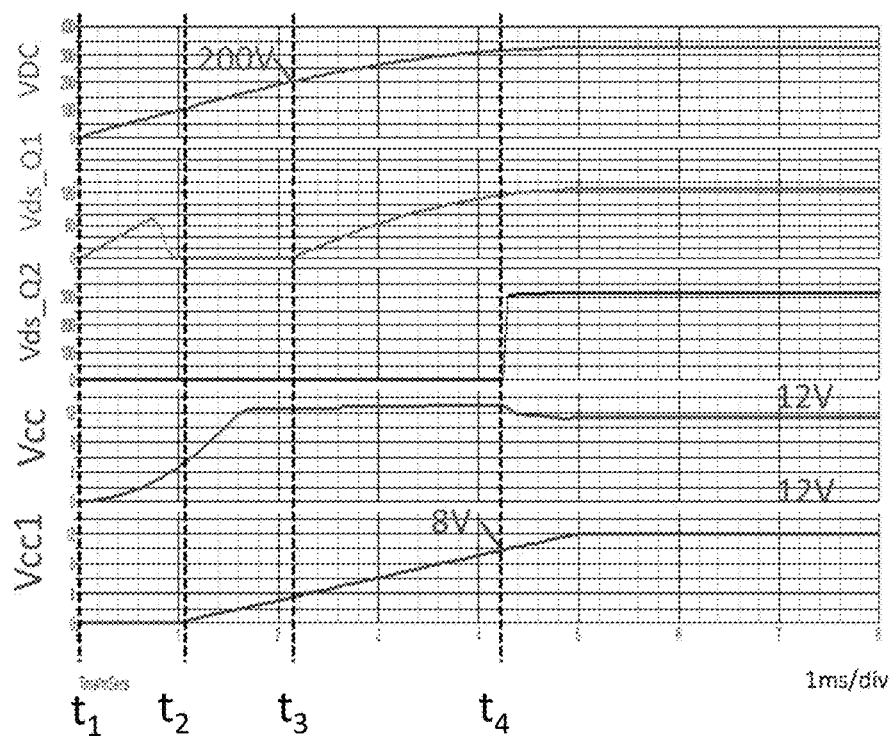
FIG. 10 shows waveforms for a simulation at 230 VAC input.

For a 230 VAC input, FIG. 10 shows simulated waveforms for: the DC voltage $V_{DC}$; the drain-source voltage $V_{ds\_Q1}$ of transistor Q1 of the HBCC; the drain-source voltage $V_{ds\_Q2}$ of transistor Q2 of the startup circuit; $V_{cc}$ at the input to the HBCC; and $V_{cc1}$ from the DC/DC converter.

In the period between $t_1$ and $t_2$: Q2 as a normally-on transistor is turned on ($V_{gs\_Q2}$=0V), the capacitor C1 is charged through R1 and $V_{DC}$, and $V_{cc}$ starts to rise, before the bias voltage $V_{cc1}$ is received from the isolated DC/DC converter.

At $t_2$: the HBCC starts to work with supply voltage $V_{cc}$.

In the period between t2 and t3: Q1 is turned on while $V_{DC}$ below the selected reference voltage, e.g. 200V, and the HBCC is working with supply voltage $V_{cc}$ from the startup circuit.

At $t_3$: $V_{DC}$ reaches ~200V, and Q1 is turned off by the HBCC, disconnecting the low voltage bulk capacitor Cin_LV.

At $t_4$: $V_{cc1}$ from isolated DC/DC converter reaches above 8V, transistor Q2 of the startup circuit is turned off by using transistor Q3 connecting the gate of Q2 to ground ($V_{gs\_Q2}$=−12V, $V_{gs\_Q3}$=0V), and $V_{cc1}$ becomes the supply voltage to the HBCC. R1 is disconnected, so there is no resistance loss.

Simulation at 110 VAC

Figure 11:
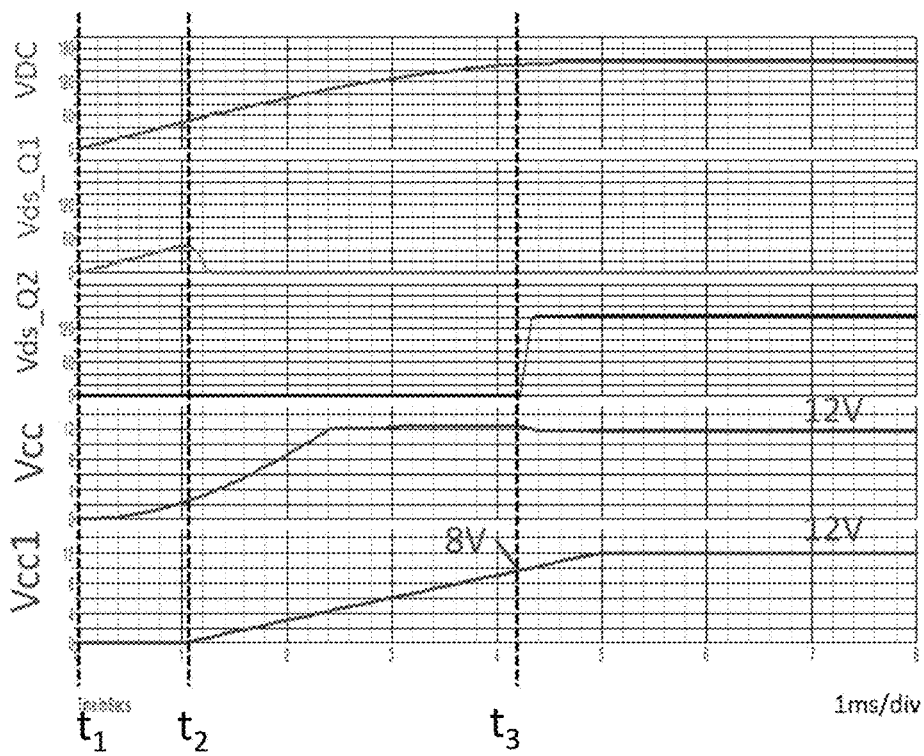
FIG. 11 shows waveforms for a simulation at 110 VAC input.

For a 110 VAC input, FIG. 11 shows simulated waveforms for: the DC voltage $V_{DC}$; the drain-source voltage $V_{ds\_Q1}$ of transistor Q1 of the HBCC; the drain-source voltage $V_{ds\_Q2}$ of transistor Q2 of the startup circuit; $V_{cc}$ at the input to the HBCC; and $V_{cc1}$ from the DC/DC converter. During period 1 to period 2: Q2 is turned on, the capacitor C1 is charged through R1 and $V_{DC}$, and $V_{cc}$ starts to rise, before the bias voltage $V_{cc1}$ is received from the isolated DC/DC converter.

In the period between $t_1$ and $t_2$: Q2 as a normally-on transistor is turned on ($V_{gs\_Q2}$=0V), the capacitor C1 is charged through R1 and $V_{DC}$, and $V_{cc}$ starts to rise, before the bias voltage $V_{cc1}$ is received from the isolated DC/DC converter.

At $t_2$: the HBCC starts to work with supply voltage $V_{cc}$.

At period 2: the HBCC starts to work with supply voltage $V_{cc}$.

In the period between $t_2$ and $t_3$: the HBCC is working with supply voltage $V_{cc}$ from the startup circuit, and transistor Q1 is always turned on while $V_{DC}$ below the selected reference voltage, e.g. 200V; meanwhile, the HBCC ensures the low voltage capacitor Cin_LV is always connected to DC link $V_{DC}$ before $V_{cc1}$ starts up to provide a larger bulk capacitance on $V_{DC}$. This can avoid issues of the overcurrent protection mis-triggering or transformer saturation during DC/DC converter start-ups if Cin_LV is not connected to DC link and the DC link capacitance is not enough.

At $t_2$: $V_{cc1}$ reaches above 8V, transistor Q2 is turned off by using transistor Q3 connecting the gate of Q2 to ground ($V_{gs\_Q2}$=−12V, $V_{gs\_Q3}$=0V). Then $V_{cc1}$ becomes the supply voltage to the HBCC; R1 is disconnected to avoid resistance loss.

This circuit design provides a fast, high voltage startup circuit which ensures that the HBCC receives a supply voltage $V_{cc}$ very rapidly at start up, i.e. within ~1 ms, to enable Q1 to be turned on to connect the low voltage bulk capacitance Cin_LV while the DC link voltage is below the selected reference voltage, e.g. 200V. If the AC input is above the reference voltage, when the DC link voltage reaches the reference voltage, Q1 is turned off, to disconnect the low voltage bulk capacitance Cin_LV. If the AC input voltage is below the reference voltage, Q1 remains switched on, so that the low voltage bulk capacitance Cin_LV is connected.

In a conventional circuit, the low voltage bulk capacitance Cin_LV is not connected at startup, so when operating with a lower AC input voltage, e.g. 110 VAC, initially only the high voltage bulk capacitance Cin_HV is connected. The small value of high voltage bulk capacitance will result in a large ripple voltage on the input to the DC/DC converter, leading to a larger peak current on the primary transistor, which may cause transformer saturation or triggering of overcurrent protection, leading to reliability issues or failure to start.

Figure 12:
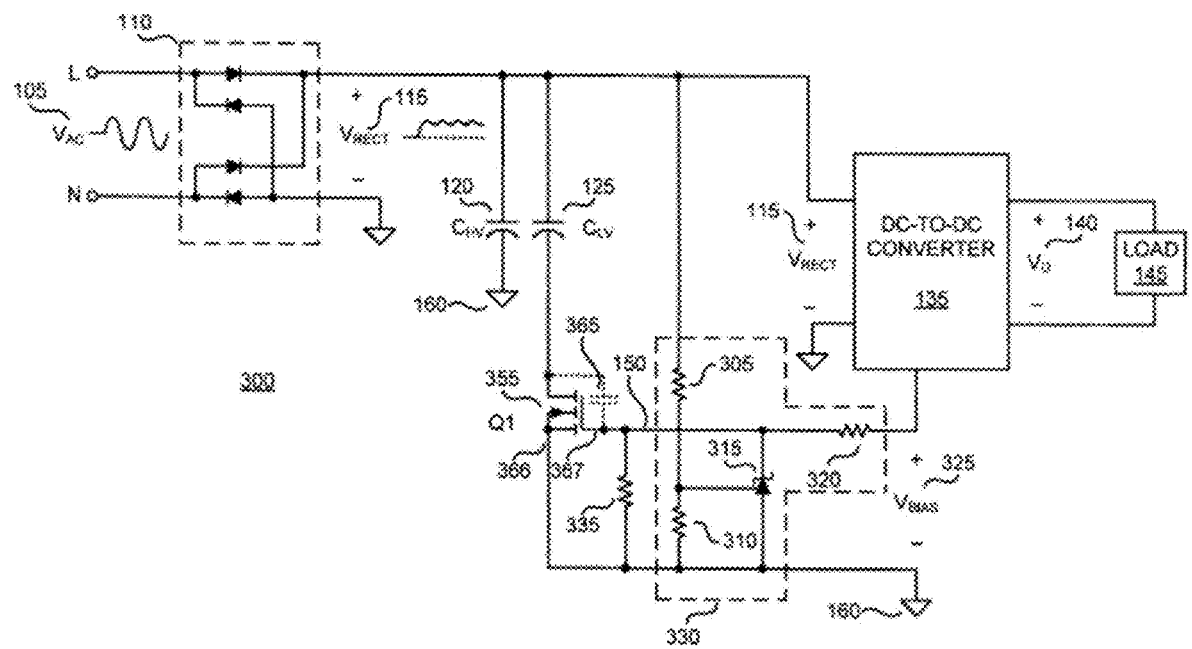
FIG. 12 (Prior Art) shows a conventional bulk capacitance circuit.

For example, FIG. 12 (Prior Art) shows a conventional circuit disclosed in U.S. Pat. No. 7,760,524, wherein the driver circuit comprises a high voltage capacitor and a low voltage capacitor. In this circuit, a bias voltage $V_{BIAS}$ from the DC/DC converter is required to supply the control circuit, so the low voltage capacitor $C_{LV}$ will not be connected as a DC link bulk capacitor, if there is no bias voltage. For low line AC input, e.g. 90V to 160 VAC, there is no bias voltage $V_{BIAS}$ and transistor Q1 is off, this results in a large ripple voltage on the rectified voltage $V_{RECT}$ at 115, with a lower minimum $V_{DC}$ voltage. This results in a larger peak current on the primary transistor, which may cause transformer saturation on the DC/DC converter or trigger overcurrent protection (OCP). When $V_{BIAS}$ is ready, transistor Q1 will turn on. $C_{LV}$ will be charged again when Q1 is turned on, and $V_{RECT}$ is dropped down for a short period, causing a much larger peak current on the primary transistor, again causing transformer saturation or triggering OCP. This event may result in power shutdown and failure to start.

An AC/DC adapter comprising a hybrid bulk capacitance circuit with a fast high voltage startup circuit of example embodiments as described herein, provides a supply voltage Vic to power the HBCC initially at startup. This means that the low voltage bulk capacitance can be connected rapidly, e.g. within ~1 ms, to avoid the above mentioned issues, for improved reliability. The system can determine the required DC link bulk capacitor that is needed before the DC/DC converter is powered up. Thus mis-triggering of overcurrent or transformer saturation is avoided during the startup time of the DC/DC converter, particularly at low line AC input.

In example embodiments, appropriate selection of high voltage bulk capacitance Cin_HV and low voltage bulk capacitance Cin_LV provides reduced or minimized capacitor volume, while allowing for the low voltage bulk capacitance to be connected when needed during startup for improved reliability. The hybrid bulk capacitance circuit and startup circuit is applicable to many types of AC/DC SNIPS without active power factor correction.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A bulk capacitor circuit for an AC input AC/DC Switching Mode Power Supply (SMPS), without active power factor correction, which provides a DC voltage $V_{DC}$ to a DC/DC converter, comprising:
   an input for connection to a power source;
   an output for connection to the DC/DC converter;
   a plurality of bulk capacitors having different voltage ratings comprising:
   a first bulk capacitor having a first capacitance value and voltage rating for a first input voltage including a maximum rated input voltage;
   a second bulk capacitor having a second capacitance value and a voltage rating for a second input voltage range below the first input voltage range, and a switch to selectively connect/disconnect the second bulk capacitor;
   driver and control circuitry comprising input voltage sensing circuitry which senses an input voltage range and provides a signal indicative of the input voltage range, and responsive to said signal, the driver and control circuitry controls the switch to selectively connect/disconnect the second bulk capacitor, wherein only the first bulk capacitor is connected to provide the first capacitance value for the first input voltage range, and the first and second bulk capacitors are connected to provide a combined first and second capacitance value for the second input voltage range; and
   a startup circuit connected to receive the DC voltage $V_{DC}$ and provide an initial supply voltage Vcc to the driver and control circuitry, so that the input voltage range is sensed, and if the input voltage range is in the second input voltage range, the first and second bulk capacitors are connected, before the control and driver circuitry provides a signal output for enabling the DC/DC converter.

2. The bulk capacitor circuit of claim 1, configured to connect said plurality of bulk capacitors to provide a bulk capacitance at startup with low line AC input, to maintain a ripple voltage in a specified range for reliable operation.

3. An AC input AC/DC Switching Mode Power Supply (SMPS) comprising the bulk capacitor circuit of claim 1.

4. A bulk capacitor circuit for an AC input AC/DC adapter comprising:
   an input for connection to a rectifier providing a rectified input voltage $V_{DC}$;
   an output for connection to a DC/DC converter;
   a first bulk capacitance (Cin_HV) having a first voltage rating and a second bulk capacitance (Cin_LV) having a second voltage rating, lower than the first voltage rating;
   a first transistor switch (Q1) configured for selectively connecting the second bulk capacitance (Cin_LV);
   a voltage sensor for sensing an AC input voltage range;
   control and driver circuitry for the first transistor switch (Q1), having a power input for receiving a supply voltage ($V_{cc1}$) from the DC/DC converter, an output for providing an enable signal to the DC/DC converter, a connection to the voltage sensor, and circuitry for comparing the AC input voltage range to a reference value; and
   startup circuitry;
   wherein the startup circuitry comprises a second transistor switch (Q2), which is normally-on, connected between $V_{DC}$ and the power input of the control and driver circuitry for supplying an initial supply voltage ($V_{cc}$) to the control and driver circuit to enable determination of the AC input voltage range during startup, and if the AC input voltage range is less than the reference value, the control and driver circuitry operates to turn-on the first transistor switch (Q1) to connect the second bulk capacitor prior to enabling the DC/DC converter, and after enabling the DC/DC converter and receiving the supply voltage ($V_{cc1}$) from the DC/DC converter, the start-up circuitry operates to turn-off the second transistor switch (Q2).

5. The bulk capacitor circuit of claim 4, wherein
   the first bulk capacitance Cin_HV has a first capacitance value $C_1$ and a voltage rating for a first AC input voltage range including a maximum rated input voltage,
   the second bulk capacitance Cin_LV has a second capacitance value $C_2$ and a voltage rating for a second AC input voltage range, below the first AC input voltage range,
   wherein the circuit operates to connect the first bulk capacitance to provide the first capacitance value $C_1$ for the first input voltage range; and to connect the first and second bulk capacitances to provide a combined capacitance value of $C_1+C^2$ for the second input voltage range.

6. The bulk capacitor circuit of claim 5, wherein the capacitor values $C_1$ and $C_2$ are calculated based on a ripple voltage wherein:

$$C=2P_{in}/(V^2_{pkmin}-V^2_{inmin})f_L$$

where $P_{in}$ is the required power, $V_{pkmin}$ is a required peak voltage at the minimum AC input voltage; $V_{inmin}$ is a required valley voltage at the minimum AC input voltage; and $f_L$ is the input line frequency.

7. The bulk capacitor circuit of claim 6, wherein $V_{inmin}$ is ≥70% of $v_{pkmin}$.

8. The bulk capacitance circuit of claim 4, wherein capacitor values are selected to meet performance requirements and to minimize a total capacitor volume of the plurality of capacitors.

9. The bulk capacitor circuit of claim 4, wherein:
the second transistor switch Q2 is a D-mode GaN transistor switch having a drain, as source and a gate, the drain being connected through the resistor (R1) to $V_{DC}$, the source being connected in series through a capacitor (C1) to a source connection;
the second transistor switch Q2 being turned-on by a gate bias Vgs_Q2=0 and turned-off by a gate bias Vgs_Q2≤−3V; and
a gate bias circuit comprising a third transistor switch Q3 for controlling the gate bias Vgs_Q2 to the gate of Q2, the gate bias circuit having an input for receiving Vcc1 from the DC/DC converter, wherein:
when Vcc1 from the DC/DC converter is less than a specified value for driving the driver and control circuitry, Q3 is turned off and Vgs_Q2=0 so that Q2 is on and the startup circuit provides the initial supply voltage Vcc to the driver and control circuitry; and
when Vcc1 from the DC/DC converter is greater than the specified value for driving the driver and control circuitry, Q3 is turned-on to pull-down Vgs_Q2 to a negative voltage to turn-off Q2.

10. The bulk capacitor circuit of claim 4 comprising a third bulk capacitance, wherein:
the circuit operates to connect the first bulk capacitor for a first AC input voltage range; to connect first and second bulk capacitors for a second AC input voltage range, and to connect first second and third capacitors for a third AC input voltage range, wherein the first AC input voltage range is higher than the second AC input voltage range and the second AC input voltage range is higher than the third AC input voltage range.

11. The bulk capacitor circuit of claim 10, wherein the first bulk capacitor is always connected, and the second and third bulk capacitor of the plurality of bulk capacitors are switchably connected.

12. The bulk capacitor circuit of claim 4, wherein each of said first and second bulk capacitances comprises one of a single capacitor and multiple capacitors connected in parallel.

13. The bulk capacitor circuit of claim 4, wherein the AC input AC/DC SMPS is a Universal input AC/DC charger, which is rated for an input of 90-265 VAC and 47-63 Hz, and for a power of ≤100 W wherein the first input voltage range comprises 160 to 265 VAC and the second input voltage range comprises 90 to 160 VAC, and comprising first and second capacitors, having values C1 rated at 400V and C2 rated at 250V, and where C1=C2.

14. The bulk capacitor circuit of claim 4, wherein the DC/DC converter comprises an active clamp flyback topology or other isolated DC/DC topologies.

15. The bulk capacitor circuit of claim 4, wherein the AC/DC SMPS is a Universal AC/DC charger/adapter.

16. The bulk capacitor circuit of claim 4, wherein, for each capacitor that is switchably connected, a switch means comprising a transistor switch is in series with said capacitor.

17. An AC input AC/DC Switching Mode Power Supply (SMPS) comprising:
a rectifier having an input for receiving an AC input voltage VAC and an output for providing
a rectified DC voltage $V_{DC}$;
a DC/DC converter for outputting a DC output voltage $V_{out}$;
a bulk capacitor circuit connected between the rectifier and the DC/DC converter;
the bulk capacitor circuit comprising:
a first bulk capacitance (Cin_HV) having a first voltage rating and a second bulk capacitance (Cin_LV) having a second voltage rating, lower than the first voltage rating;
a first transistor switch Q1 configured for selectively connecting the second bulk capacitance (Cin_LV);
a voltage sensor for providing a signal indicative of an AC input voltage range;
control and driver circuitry for the first transistor switch Q1, having a power input for receiving a supply voltage ($V_{cc1}$) from the DC/DC converter, an output for providing an enable signal to the DC/DC converter, a connection to the voltage sensor, and circuitry for comparing the signal indicative of the AC input voltage range to a reference value; and
startup circuitry;
wherein the startup circuitry comprises a resistor in series with a second transistor switch Q2, which is normally-on, connected between $V_{DC}$ and the power input of the control and driver circuitry for supplying an initial supply voltage ($V_{cc}$) to the control and driver circuit to enable determination of the AC input voltage range during startup, and if the AC input voltage range is below a threshold value, the control and driver circuitry operates to turn-on the first transistor switch Q1 to connect the second bulk capacitor prior to enabling the DC/DC converter, and after enabling the DC/DC converter and receiving the supply voltage ($V_{cc1}$) from the DC/DC converter, the start-up circuitry operates to turn-off the second transistor switch Q2.

18. The AC input AC/DC SMPS of claim 17, wherein the second transistor switch Q2 is a D-mode GaN transistor switch having a drain, as source and a gate, the drain being connected through the resistor (R1) to $V_{DC}$, the source being connected in series through a capacitor (C1) to a source connection;
the second transistor switch being turned-on by a gate bias the gate bias Vgs_Q2=0 and turned-off by a gate bias Vgs_Q2≤−3V; and
a gate bias circuit comprising a third transistor switch Q3 for controlling the gate bias Vgs_Q2 to the gate of Q2, the gate bias circuit having an input for receiving Vcc1 from the DC/DC converter,
wherein:
when Vcc1 from the DC/DC converter is less than a specified value for driving the driver and control circuitry, Q3 is turned off and Vgs_Q2=0 so that Q2 is on and the startup circuit provides the initial supply voltage Vcc to the driver and control circuitry; and when Vcc1 from the DC/DC converter is greater than the specified value for driving the driver and control circuitry, Q3 is turned-on to pull down Vgs_Q2 to a negative voltage to turn-off Q2.

19. The AC input AC/DC SMPS of claim 17, wherein the startup circuitry is integrated with the control and driver circuitry of the bulk capacitor circuit.

20. The AC input AC/DC SMPS of claim 17, wherein the startup circuitry is integrated with the DC/DC converter.

* * * * *